(12) United States Patent
Scott et al.

(10) Patent No.: US 8,589,214 B1
(45) Date of Patent: Nov. 19, 2013

(54) HEALTH METER FOR EVALUATING THE STATUS OF PROCESS SAFETY OF AT LEAST ONE FACILITY AS AN EXECUTIVE DASHBOARD ON A CLIENT DEVICE CONNECTED TO A NETWORK

(75) Inventors: Michael Dean Scott, Anchorage, AK (US); Carolyn Crosby Presgraves, Anderson, SC (US); Brian Dudley Merriman, Anderson, SC (US); Kenneth James O'Malley, Jr., Simpsonville, SC (US)

(73) Assignee: AE Solutions, Greenville, SC (US)

( * ) Notice: Subject to any disclaimer, the term of this patent is extended or adjusted under 35 U.S.C. 154(b) by 122 days.

(21) Appl. No.: 13/250,899

(22) Filed: Sep. 30, 2011

Related U.S. Application Data

(60) Provisional application No. 61/388,423, filed on Sep. 30, 2010, provisional application No. 61/388,437, filed on Sep. 30, 2010.

(51) Int. Cl.
*G06Q 10/00* (2012.01)
(52) U.S. Cl.
USPC .......................................... 705/7.39; 705/7.28
(58) Field of Classification Search
USPC ............................................... 705/7.39, 7.28
See application file for complete search history.

(56) References Cited

U.S. PATENT DOCUMENTS

| Patent/Pub No. | | Date | Inventor | Class |
|---|---|---|---|---|
| 7,406,431 B2 * | | 7/2008 | Spira et al. | 705/7.21 |
| 7,409,357 B2 * | | 8/2008 | Schaf et al. | 705/7.28 |
| 8,364,519 B1 * | | 1/2013 | Basu et al. | 705/7.38 |
| 2004/0138933 A1 * | | 7/2004 | LaComb et al. | 705/7 |
| 2005/0027379 A1 * | | 2/2005 | Dyk et al. | 700/79 |
| 2005/0096950 A1 * | | 5/2005 | Caplan et al. | 705/7 |
| 2005/0251432 A1 * | | 11/2005 | Barker et al. | 705/7 |
| 2006/0009992 A1 * | | 1/2006 | Cwiek et al. | 705/1 |
| 2006/0161471 A1 * | | 7/2006 | Hulen et al. | 705/10 |
| 2007/0050237 A1 * | | 3/2007 | Tien et al. | 705/11 |
| 2007/0112607 A1 * | | 5/2007 | Tien et al. | 705/7 |
| 2007/0156478 A1 * | | 7/2007 | Breene et al. | 705/7 |
| 2008/0059292 A1 * | | 3/2008 | Myers et al. | 705/11 |
| 2008/0154679 A1 * | | 6/2008 | Wade | 705/7 |
| 2008/0276206 A1 * | | 11/2008 | Mariani | 716/4 |
| 2008/0281651 A1 * | | 11/2008 | Brennan et al. | 705/7 |
| 2008/0312986 A1 * | | 12/2008 | Braun et al. | 705/7 |
| 2009/0012631 A1 * | | 1/2009 | Fuller | 700/1 |
| 2009/0281845 A1 * | | 11/2009 | Fukuda et al. | 705/7 |

OTHER PUBLICATIONS

A simple reliability block diagram method for safety integrity verification H Guo, X Yang—Reliability Engineering & System Safety, 2007—Elsevier.*
Layer of protection analysis for determining safety integrity level AM Dowell III—Isa Transactions, 1998—Elsevier.*
The impact of data uncertainty in determining Safety Integrity Level Y Wang, HH West, MS Mannan—Process Safety and Environmental . . . , 2004—Elsevier.*

(Continued)

*Primary Examiner* — Jonathan G Sterrett
(74) *Attorney, Agent, or Firm* — Buskop Law Group, PC; Wendy Buskop

(57) ABSTRACT

A health meter for evaluating the status of process safety of at least one facility as an executive dashboard on client devices can be presented to a plurality of users simultaneously and continuously updated by operators, contractors and other safety personnel in real-time. The health meter can include a plurality of computer instructions for presenting information to users, allowing the users to monitor compliance.

39 Claims, 11 Drawing Sheets

(56) References Cited

OTHER PUBLICATIONS

A Case Study: Safety Instrumented Burner Management System (SI-BMS), Mike Scott, Bud Adler, presented at ISA Safety Symposium, Houston, TX, May 24, 2006.*

The Development of a Commercial "Shrink-Wrapped Application" to Safety Integrity Level 2: the Dust-Expert™ Story T Clement, I Cottam, p. Froome, C Jones—Computer Safety, Reliability and . . . , 1999—Springer.*

* cited by examiner

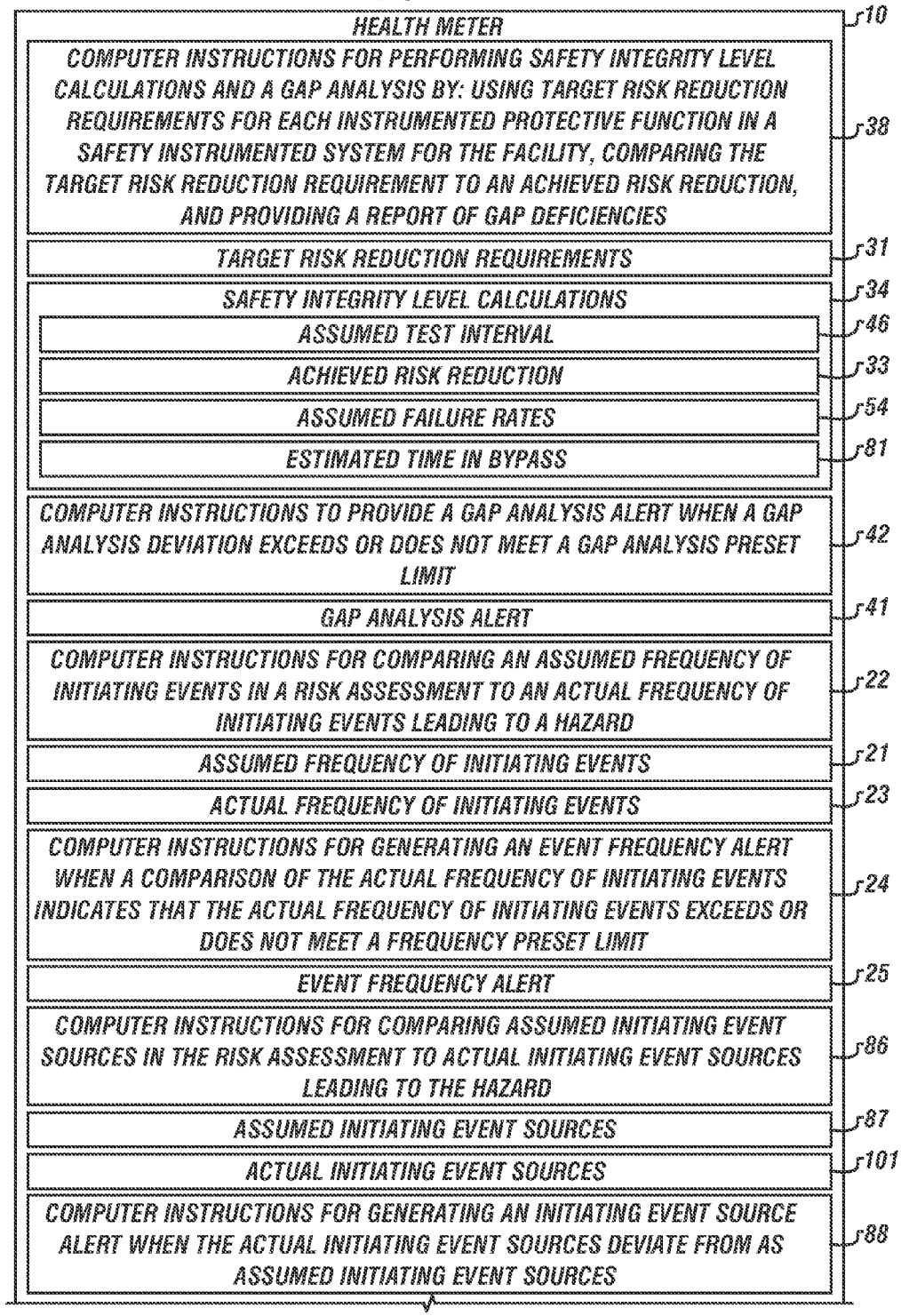

FIGURE 2B

- 10
- INITIATING EVENT SOURCE ALERT — 89
- COMPUTER INSTRUCTIONS TO COMPARE ACTUAL FAILURE RATES TO ASSUMED FAILURE RATES IN THE SAFETY INTEGRITY LEVEL CALCULATIONS — 52
- ASSUMED FAILURE RATES — 54
- ACTUAL FAILURE RATES — 56
- COMPUTER INSTRUCTIONS TO GENERATE AN ACTUAL FAILURE RATE ANALYSIS ALERT WHEN A COMPARISON OF THE ACTUAL FAILURE RATES TO ASSUMED FAILURE RATES INDICATES THE ACTUAL FAILURE RATES DEVIATE FROM A FAILURE RATE PRESET LIMIT — 58
- ACTUAL FAILURE RATE ANALYSIS ALERT — 57
- COMPUTER INSTRUCTIONS TO COMPARE AN ASSUMED TEST INTERVAL IN THE SAFETY INTEGRITY LEVEL CALCULATIONS TO AN ACTUAL TEST INTERVAL PERFORMANCE RESULT — 44
- ACTUAL TEST INTERVAL PERFORMANCE RESULT — 48
- COMPUTER INSTRUCTIONS TO PROVIDE A TEST INTERVAL PERFORMANCE ALERT WHEN A TEST INTERVAL PERFORMANCE ANALYSIS DEVIATION EXCEEDS OR DOES NOT MEET A TEST INTERVAL PRESET LIMIT — 50
- TEST INTERVAL PERFORMANCE ALERT — 51
- COMPUTER INSTRUCTIONS TO COMPARE ESTIMATED TIME IN BYPASS USED IN THE SAFETY INTEGRITY LEVEL CALCULATIONS TO AN ACTUAL TIME IN BYPASS TO GENERATE A TIME IN BYPASS ANALYSIS ALERT WHEN THE COMPARISON INDICATES THAT THE ACTUAL TIME IN BYPASS DEVIATES FROM A TIME IN BYPASS PRESET LIMIT — 83
- ACTUAL TIME IN BYPASS — 84
- TIME IN BYPASS ANALYSIS ALERT — 85
- COMPUTER INSTRUCTIONS TO PROVIDE A PERCENT COMPLETION ANALYSIS OF SAFETY INTEGRITY LEVEL CALCULATIONS REQUIRED BY THE RISK ASSESSMENT — 82
- SAFETY INTEGRITY LEVEL CALCULATION COMPLETION ALERT — 71
- COMPUTER INSTRUCTIONS TO GENERATE A PERCENT COMPLETION ALERT WHEN THE PERCENT COMPLETE DEVIATES FROM A PERCENT COMPLETION PRESET LIMIT — 65
- PERCENT COMPLETION ALERT — 66

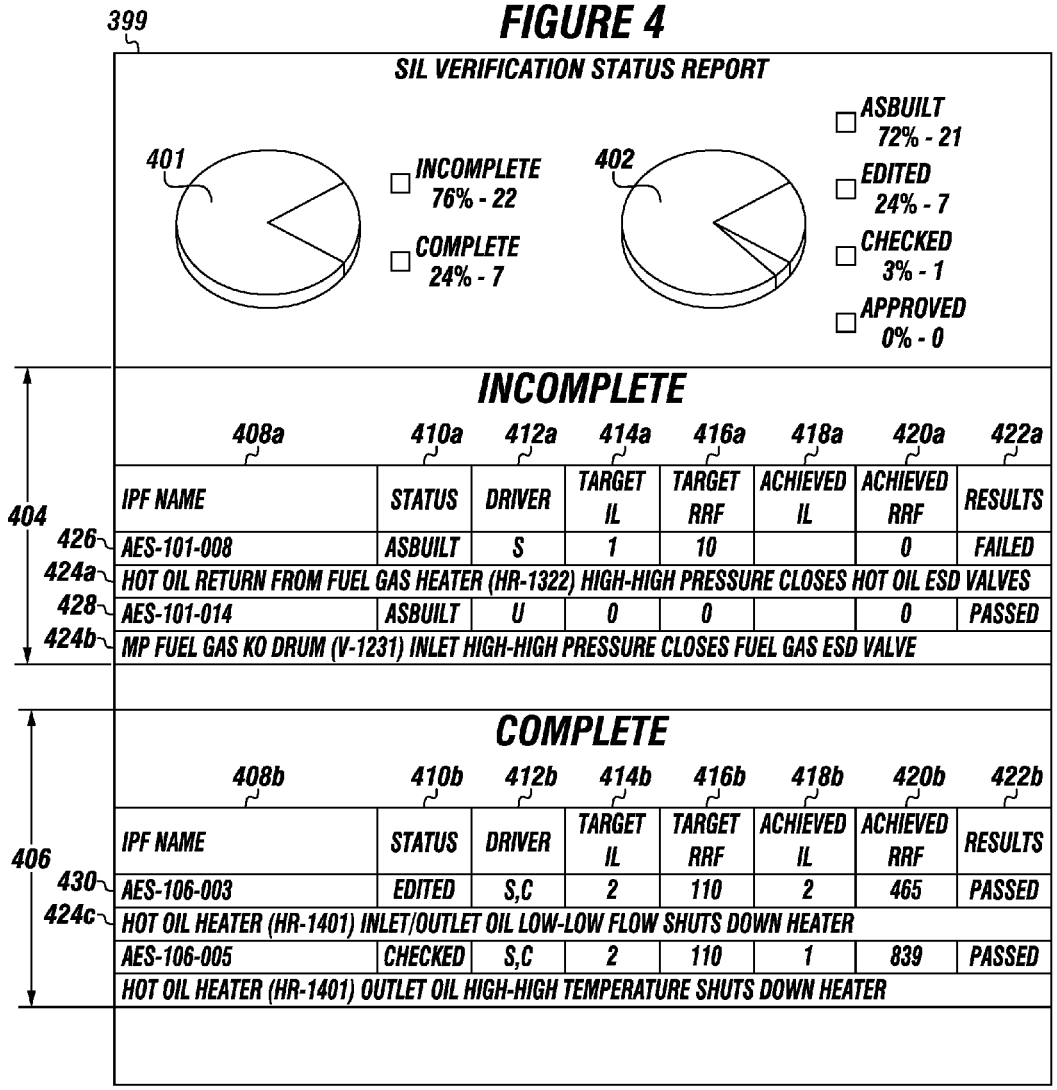

FIGURE 5

SAMPLE HEALTH METER REPORT - GAP ANALYSIS

PHA SCENARIO SUMMARY (500)

| TARGET IL | DRIVER | COUNT |
|---|---|---|
| 1 | C | 3 |
| 1 | S | 1 |
| 2 | C | 2 |
| TOTAL: | | 6 |
| COMMERCIAL: | | 5 |
| NON-COMMERCIAL: | | 1 |

IPF (INSTRUMENTED PROTECTIVE FUNCTIONS) SUMMARY (502)

| TARGET IL | DRIVER | COUNT |
|---|---|---|
| 1 | C | 3 |
| 1 | S | 1 |
| 2 | C | 2 |
| TOTAL: | | 6 |
| COMMERCIAL: | | 5 |
| NON-COMMERCIAL: | | 1 |

TAG NUMBER SUMMARY (504)

| TARGET IL | DRIVER | COUNT |
|---|---|---|
| 1 | C | 5 |
| 1 | S | 4 |
| 2 | C | 19 |
| TOTAL: | | 28 |
| COMMERCIAL: | | 24 |
| NON-COMMERCIAL: | | 4 |

COMMERCIAL IPF GAPS

| IPF NAME | DRIVER | TARGET IL | TARGET RRF | ACHIEVED IL | ACHIEVED RRF | RFF GAP |
|---|---|---|---|---|---|---|
| AE2-114-027 | C | 2 | 100 | 0 | 0 | 100 |
| IPF DESCRIPTION: REFRIGERANT COMPRESSOR TRAIN I (CMP-0206) LOSS OF FLAME SHUTS DOWN COMPRESSOR | | | | | | |
| AE2-114-028 | C | 2 | 100 | 0 | 0 | 100 |
| IPF DESCRIPTION: REFRIGERANT COMPRESSOR TRAIN I (CMP-0206) HIGH-HIGH TEMP SHUTS DOWN COMPRESSOR | | | | | | |

FIGURE 7B

| | |
|---|---|
| COMPUTER INSTRUCTIONS TO CREATE A REPORT SHOWING SPECIFIC COMPONENT INFORMATION FOR LIKE COMPONENTS USED FOR RISK REDUCTION IN THE PROCESS HAZARD ANALYSIS AND LAYERS OF PROTECTION ANALYSIS FOR THE FACILITY | 713 |
| COMPUTER INSTRUCTIONS TO CREATE A RECOMMENDATIONS LOG FROM THE PROCESS HAZARD ANALYSIS AND LAYERS OF PROTECTION ANALYSIS STUDIES | 714 |
| COMPUTER INSTRUCTIONS TO ALLOW USERS TO SEARCH THE RECOMMENDATIONS LOG BASED ON: TAG NAME, FACILITY, MODULE, AREA, SAFETY INSTRUMENTED FUNCTIONS NAME, OR PROCESS HAZARD ANALYSIS NODE NUMBER | 715 |
| COMPUTER INSTRUCTIONS TO ALLOW CALCULATIONS THAT ALLOW USERS TO COMPARE AT LEAST TWO POSSIBLE ARCHITECTURES FOR A SAFETY INSTRUMENTED FUNCTION | 716 |
| COMPUTER INSTRUCTIONS THAT ALLOW USERS TO CREATE COPIES OF A FIRST POSSIBLE ARCHITECTURE AND MAKE MODIFICATIONS OF THE FIRST POSSIBLE ARCHITECTURE | 717 |
| COMPUTER INSTRUCTIONS THAT ALLOW USERS TO CHANGE WHICH OF THE POSSIBLE ARCHITECTURES IS CURRENTLY MARKED FOR USE | 718 |
| COMPUTER INSTRUCTIONS TO ALLOW USERS TO IMPORT DATA FOR AN EXISTING FACILITY ASSET MANAGEMENT SYSTEM TO POPULATE A COMPONENT LIBRARY IN THE DATA STORAGE | 719 |
| COMPONENT LIBRARY | 720 |
| COMPUTER INSTRUCTIONS TO CREATE A REPORT IDENTIFYING DEVIATIONS BETWEEN THE FACILITY ASSET MANAGEMENT SYSTEM OF THE FACILITY AND THE IMPORTED DATA IN THE DATA STORAGE | 721 |
| COMPUTER INSTRUCTIONS TO ALLOW USERS TO EDIT CAUSE AND EFFECT DOCUMENTS, AND ALLOW THE USERS TO ADD CAUSE AND EFFECT DOCUMENTS NOT USED IN THE SAFETY INTEGRITY LEVEL CALCULATIONS | 722 |
| COMPUTER INSTRUCTIONS TO ALLOW USERS TO CREATE PROTECTIONS LAYERS NOT USED IN LAYERS OF PROTECTION ANALYSIS OR THE SAFETY INTEGRITY LEVEL CALCULATIONS | 723 |
| COMPUTER INSTRUCTIONS TO ENTER EFFECTS AS ADDITIONAL ACTIONS | 724 |
| COMPUTER INSTRUCTIONS TO ALLOW USERS TO VIEW REPORTS OF PROJECT STATUS | 725 |

| | |
|---|---|
| COMPUTER INSTRUCTIONS TO GENERATE FACILITY ACCEPTANCE TESTS USING A SOFTWARE MODEL OF PHYSICAL AND FUNCTIONAL SPECIFICATIONS | 726 |
| SOFTWARE MODEL OF PHYSICAL AND FUNCTIONAL SPECIFICATIONS | 727 |
| COMPUTER INSTRUCTIONS TO GENERATE SITE ACCEPTANCE TESTS USING THE SOFTWARE MODEL OF PHYSICAL AND FUNCTIONAL SPECIFICATIONS | 728 |
| COMPUTER INSTRUCTIONS TO GENERATE FUNCTIONAL TEST PLANS FOR EACH SAFETY INSTRUMENTED FUNCTION OF THE INSTRUMENTED PROTECTIVE FUNCTION | 729 |
| COMPUTER INSTRUCTIONS TO GENERATE A CRITICAL ALARM LIST INCLUDING RISK RANKING OF HAZARDS TO WHICH ALARMS APPLIES | 730 |
| COMPUTER INSTRUCTIONS TO GENERATE A REPORT OF TEST PERFORMANCE FOR CRITICAL ALARMS | 731 |
| COMPUTER INSTRUCTIONS TO GENERATE A REPORT SHOWING IMPACT OF BYPASSING ON A RISK GAP BEING OPENED BY PLACING EQUIPMENT IN BYPASS | 732 |
| COMPUTER INSTRUCTIONS TO CATEGORIZE FAILURES FORM FAILURE RATE ANALYSIS AND PROVIDE STATISTICALLY ANALYZED FAILURE RATES TO BE USED IN SAFETY INTEGRITY LEVEL CALCULATIONS | 733 |
| COMPUTER INSTRUCTIONS TO ALLOW USERS TO SELECT WHICH SET OF RELIABILITY DATA THEY WANT TO USE | 734 |
| RELIABILITY LIBRARY | 735 |
| COMPUTER INSTRUCTIONS AND SYSTEM ARCHITECTURE TO SUPPORT MANAGEMENT OF CHANGE (MOC) OF DATA RECORDS | 736 |
| COMPUTER INSTRUCTIONS THAT PERMIT A USER TO CHANGE ANY ONE COMPONENT, ONE ASSEMBLY, ONE ASSEMBLY GROUP, OR COMBINATIONS THEREOF OR THE VOTING INSTRUCTIONS OF A TAG BASED SOFTWARE MODEL | 738 |
| COMPUTER INSTRUCTIONS THAT PROVIDE A CONNECTION TO TAG BASED ASSETS OF THE FACILITY THAT ALLOWS TRANSFER OF DATA FROM TAG BASED ASSETS TO THE DATA STORAGE ASSOCIATED WITH THE PROCESSOR | 740 |
| COMPUTER INSTRUCTIONS TO USE RELATIONSHIP TABLES AND LIBRARIES TO FORM A CAUSE AND EFFECT REPORT | 742 |

FIGURE 7C

HEALTH METER FOR EVALUATING THE STATUS OF PROCESS SAFETY OF AT LEAST ONE FACILITY AS AN EXECUTIVE DASHBOARD ON A CLIENT DEVICE CONNECTED TO A NETWORK

CROSS REFERENCE TO RELATED APPLICATIONS

The present application is a non-provisional of and claims priority to and the benefit of U.S. Provisional Patent Application Ser. No. 61/388,423 filed on Sep. 30, 2010, entitled "HEALTH METER FOR EVALUATING THE STATUS OF PROCESS SAFETY OF AT LEAST ONE FACILITY AS AN EXECUTIVE DASHBOARD ON A CLIENT DEVICE CONNECTED TO A NETWORK", and of U.S. Provisional Patent Application Ser. No. 61/388,437 filed on Sep. 30, 2010, entitled "SYSTEM TO BUILD, ANALYZE AND MANAGE A REAL WORLD MODEL IN SOFTWARE OF A SAFETY INSTRUMENTED SYSTEM ARCHITECTURE FOR SAFETY INSTRUMENTED SYSTEMS IN A FACILITY", which are incorporated herein in their entirety.

FIELD

The present embodiments generally relate to a health meter for evaluating the status of process safety of at least one facility as an executive dashboard for simultaneous viewing of compliance by a plurality of users on client devices connected to a network while compliance steps are being taken.

BACKGROUND

A need exists for a health meter software program that enables multiple users to simultaneously view the status of process safety integrity and health in real-time for a facility, while regulatory compliance is being implemented and/or maintained.

The present embodiments meet this need.

BRIEF DESCRIPTION OF THE DRAWINGS

The detailed description will be better understood in conjunction with the accompanying drawings as follows:

FIGS. 2A-2C depict an embodiment of the health meter.

FIG. 4 depicts an SIL verification status report.

FIG. 5 depicts a health meter report showing gap deficiencies.

FIGS. 7A-7C depict additional computer instructions of the health meter.

Figure 1:
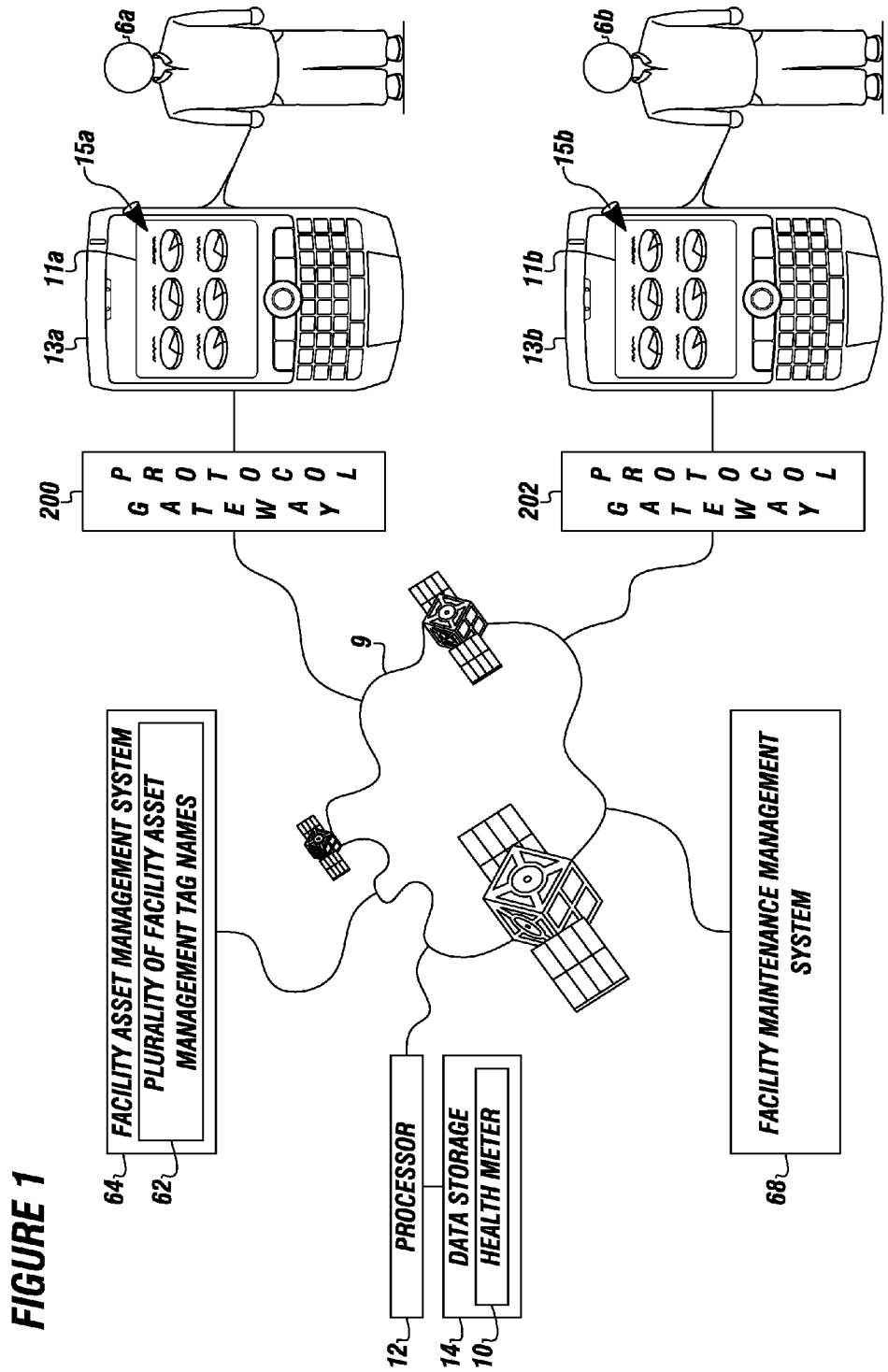
FIG. 1 depicts a diagram of a system for using the health meter.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a health meter for evaluating the status of process safety of at least one facility. The health meter can be presented as an executive dashboard on client devices connected to a network. The executive dashboard can be available to a plurality of users simultaneously.

The health meter can help prevent hazardous events, such as explosions, in a facility by making measurements of safety devices that can be used to predict the possibility of loss of containment of dangerous, volatile, explosive, or otherwise hazardous and toxic materials.

The health meter can help prevent environmental spills by showing to a plurality of untrained and trained users when particular devices become compromised in their ability to perform their intended protective function; thereby allowing the users to act in real-time to respond to the potential hazards.

The health meter can enable facilities to be safer for humans to work in and breathe in, in-part because the executive dashboard can show information on when emissions are more likely to occur, which can be harmful to workers at the facility and people nearby the facility.

The health meter can help prevent death and injury by identifying protection layers that prevent death and injury.

For example, the health meter can monitor the status of blow out preventers, maintenance, and other equipment on oil rigs; which can help prevent large environmental disasters. The health meter can alert viewers of a faulty maintenance schedule for a blowout preventer, which could cause a defect. The health meter can instantly alert rig operators and on-shore management, in real-time, of the faulty maintenance, such as if preventive maintenance was behind schedule or not performed. As such, the health meter can prevent operators on rigs from proceeding with operations under faulty maintenance situations, which can save lives and prevent oil spills.

A hazard can be a hazard of an environmental nature, such as an oil spill when a blowout preventer fails, or other hazards, such as fires and explosions that can be caused when a component, assembly, or groups of assemblies fail. A failure can be an equipment failure, such as when a blowout preventer fails due to use of an incorrect part. A failure can also be due to a maintenance person failing to perform scheduled maintenance.

In one or more embodiments, combinations of libraries and relationship tables can define the physical specifications needed to operate the facility safely with the safety instrumented system. The physical specifications can be the actual hardware, software, process, or procedure of the facility, as well as how these elements are actually connected together or used in sequence.

The combination of computer instructions in the health meter, when actuated, can execute the safety integrity level calculations based on the physical specifications, voting instructions, and test interval specifications, and can determine an average probability of failure on demand for each instrumented protective function.

For example, an average probability of failure on demand of an instrumented protective function can be $1.57 \times 10^{-2}$.

The health meter can include computer instructions that permit a user to change any one component, assembly, assembly group, or combinations thereof, or to change the voting instructions of a tag based software model.

In one or more embodiments, the health meter can further include computer instructions that provide a connection to tag based assets of the facility, allowing transfer of data from tag based assets to the data storage associated with the processor.

The software model of the instrumented protective function can include a logic solver to execute the voting instructions that carry out the functions of the instrumented protective function. The logic solver can provide a voting relationship, or functional relationship, between the assemblies and assembly groups. The health meter can include computer instructions to use relationship tables and libraries to form a cause and effect report.

Turning now to the Figures, FIG. 1 depicts a health meter 10, which can be a software program stored in a data storage 14.

The data storage 14 can be in communication with a processor 12. The processor 12 can be in communication with a plurality of client devices 13a-13b through a network 9.

The health meter 10 can present an executive dashboard 15a-15b on a display screen 11a-11b of each client device 13a-13b. As such, a plurality of users 6a-6b can monitor a status of OSHA compliance for at least a portion of a facility.

The health meter can use a plurality of computer instructions in the data storage 14 to form the executive dashboards 15a-15b.

A facility asset management system 64 of the facility can be in communication with the network 9 and the processor 12. The facility asset management system 64 can include a plurality of facility asset management tag names 62 for each piece of equipment, process, software, and/or procedure residing in the facility. The facility asset management tag names 62 can apply to equipment, process, software, and/or procedures in the facility that are subject to a risk and hazard assessment, which can optionally include a layer of protection analysis (LOPA). Layer of protection analysis is also referred herein to as "risk assessment."

The facility asset management system 64 can be a database in a web server connected to the network 9, or can be in another server with another processor and another data storage connected to the network 9.

A facility maintenance management system 68 can be in communication with the network 9 and the processor 12, which can also have a plurality of tags for matching with tags of the health meter 10.

The facility maintenance management system 68 can be a database in a web server connected to the network 9, or can be in another server with another processor and another data storage connected to the network 9.

In one or more embodiments, information can be transmitted to the client devices 13a-13b through one or more gateway protocols 200 and 202. The gateway protocols 200 and 202 can be Megaco/H.248 protocols, simple message transfer protocols (SMTP), short message service protocols (SMS), multimedia message service protocols (MMS), enhanced message service protocols (EMS), media protocol control protocols (MGCP), SIP protocols, H.323 protocols, ISDN protocols, PSTN protocols, or combinations thereof.

Figure 2C:
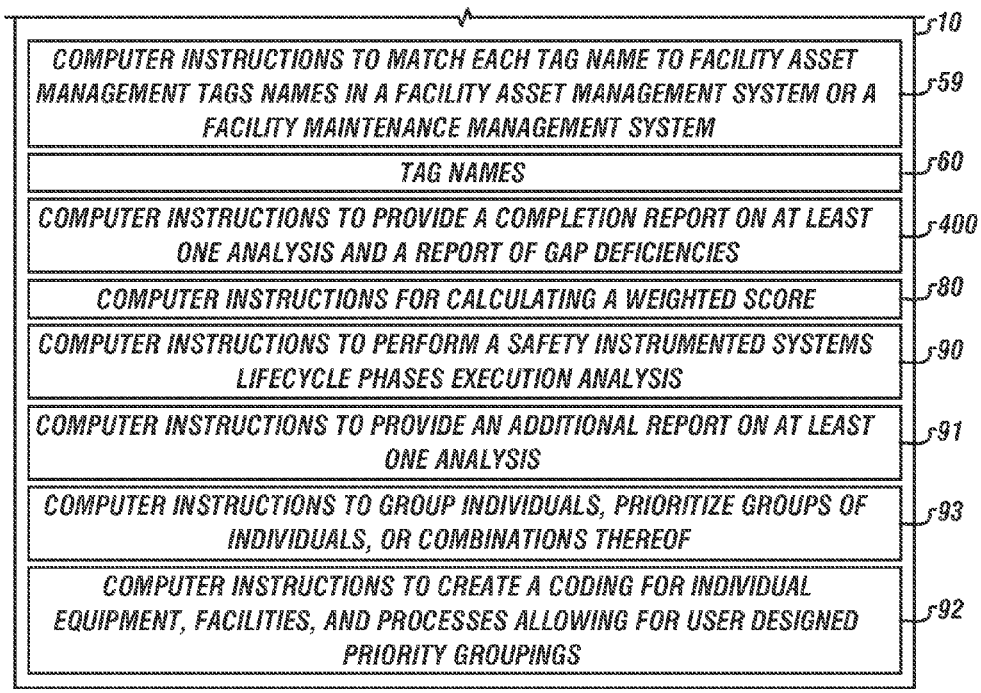

FIGS. 2A-2C depict a diagram of the health meter 10. The health meter 10 can be formed by a plurality of computer instructions, which can form alerts for presentation on the executive dashboard. In operation, the health meter 10 can be used to evaluate a status of process safety for at least one facility, and to present the evaluation in the executive dashboard to a plurality of users simultaneously.

In one or more embodiments, the various alerts of the health meter 10 can be provided as emails, text messages, flashing lights, and/or audio alerts on the client devices. The client devices can be laptops, cell phones, desktop computers, or other devices for alerting users of a situation that needs to be addressed.

The health meter 10 can provide information continuously to the users, and the information can be updated, such as when operators, contractors, and compliance and safety personnel provide new information to the health meter 10 in real-time, 24 hours a day, and 7 days a week. Real-time can be a time ranging from less than 1 day to 30 days. For example, new evaluations or safety integrity level calculations 34 can be performed every 7 days.

The health meter 10 can help the US economy grow by providing safer jobs to workers in plants, allowing private companies to pay less for insurance since the risks can be more quantifiable and manageable, and providing a tool that multiple employees of one company can view, such that intervention can occur by one or more employees to ensure compliance.

The health meter 10 can include computer instructions for performing safety integrity level calculations and a gap analysis by: using target risk reduction requirements for each instrumented protective function in a safety instrumented system for the facility, comparing the target risk reduction requirement to an achieved risk reduction, and providing a report of gap deficiencies 38.

The health meter 10 can include the target risk reduction requirements 31.

The health meter 10 can include the safety integrity level calculations 34, which can include: an assumed test interval 46, achieved risk reduction 33, assumed failure rates 54, and an estimated time in bypass 81.

Safety integrity level (SIL) refers to the range of probability of failure upon demand as determined by a failure rate of individual components and the safety integrity function (SIF) architecture (redundancy) of the components. The SIL can be a discrete level for specifying the safety integrity requirements of the SIF to be allocated to the safety instrumented systems (SIS).

For example, the SIL can be a measure of a safety instrumented function's risk reduction capability in protecting against a hazard to people or the environment. If the likelihood that the hazard will occur is greater, or if the consequence of the hazard occurring is great, then the SIL of the SIF guarding against the hazard should be great. The SIL can be measured in 4 levels.

The safety instrumented function (SIF) refers to a safety function that specifies a safety integrity level that can be necessary to achieve functional safety, which can be either a safety instrumented protection function or a safety instrumented control function. The safety instrumented function can be a combination of instrumentation and control logic that ensures undesirable deviation that can lead to a hazardous condition, and carries out a specific action that prevents the hazardous condition from occurring.

The safety instrumented function can be a function implemented by an SIS to achieve and to maintain a safe state for a process with respect to a specific hazardous event. For example, a target risk reduction requirement for an SIF can be a high temperature shut down for a process heater in a refinery.

Another example of a target risk reduction requirement can be the loss of a burner flame in a refinery furnace, which results in the collection of unburned fuel in the furnace's combustion chamber. The potential explosion that can result when the unburned fuel finds an ignition source can result in fatalities. Through the analysis process provided with the health meter 10, it can be determined that the loss of flame can occur every 100 years, for example. The furnace operating company can place a tolerable frequency on this consequence of not more frequently than once every 10,000 years. As such, the risk reduction required to reduce the frequency from 100 years to 10,000 years is a factor of 100 (100/year*1/100=1/10,000). Therefore, the target risk reduction requirement for the safety instrumented function safeguarding against this hazard is 100.

In operation, the report of gap deficiencies can be transmitted onto the executive dashboard to multiple users simultaneously. The report of gap deficiencies can be a computer generated report that provides a comparison between safety values, including the target risk reduction requirements from the LOPA and the achieved risk reduction from the SIL calculations. For example, a gap analysis on a process heater can identify that the target risk reduction requirement of 100 is not being met by the SIF with an achieved risk reduction of less than 100.

The health meter 10 can include computer instructions to provide a gap analysis alert when a gap analysis deviation exceeds or does not meet a gap analysis preset limit 42. The gap analysis alert 41 can be presented on the executive dashboard.

The health meter 10 can include computer instructions for comparing an assumed frequency of initiating events in a risk assessment to an actual frequency of initiating events leading to a hazard 22.

The health meter 10 can include the assumed frequency of initiating events 21 in the risk assessment, such as in a LOPA, and the actual frequency of initiating events 23.

The health meter 10 can include computer instructions for generating an event frequency alert when a comparison of the actual frequency of initiating events indicates that the actual frequency of initiating events exceeds or does not meet a frequency preset limit 24. The event frequency alert 25 can be presented on the executive dashboard. Frequencies of initiating events leading to a potential hazard or a potential failure can refer to how often, by a unit of time that an initiating event occurs.

The health meter 10 can include computer instructions for comparing assumed initiating event sources in the risk assessment to actual initiating event sources leading to the hazard 86. The health meter 10 can include the assumed initiating event sources 87 and actual initiating event sources 101 leading to the hazard.

The health meter 10 can include computer instructions for generating an initiating event source alert when the actual initiating event sources deviate from as assumed initiating event sources 88. The initiating event source alert 89 can be presented on the executive dashboard.

The health meter 10 can include computer instructions to compare actual failure rates to assumed failure rates in the safety integrity level calculations 52. The health meter 10 can include the actual failure rates 56 and assumed failure rates 54.

Initiating events can include human errors, failure in a process control loop, and failure of an individual component, such as a level control loop, as well as numerous other types of initiating events. Insufficient redundancy or incorrect maintenance can be the cause of an initiating event.

The health meter 10 can include computer instructions to generate an actual failure rate analysis alert when a comparison of the actual failure rates to assumed failure rates indicates the actual failure rates deviate from a failure rate preset limit 58. The actual failure rate analysis alert 57 can be presented on the executive dashboard.

For example, a failure rate analysis can be performed on pieces of equipment, software, or combinations thereof at the facility. The assumed failure rate 54 from the safety integrity level calculations 34 can be compared to the actual failure rate 56 from the facility, and the failure rate analysis alert 57 can be provided when required.

In operation, components to safety integrity level calculations 34 can be matched to facility asset management system tag names in the facility asset management system. The match can allow the assumed failure rate 54 in the data storage to be compared to data points, such as the actual failure rates 56 being recorded by the facility asset management system. For example, an asset with a tag name PS-120 in the data storage can be matched to the tag name PS-120 in the facility asset management system. The failure rate for PS-120 in data storage can be 1 in 38,000 hours, and the failure rate for PS-120 in the facility asset management system can be a recorded rate of 1 in 24,000 hours.

The health meter 10 can include computer instructions to compare an assumed test interval in the safety integrity level calculations to an actual test interval performance result 44. The health meter 10 can include the actual test interval performance result 48.

The health meter 10 can include computer instructions to provide a test interval performance alert when a test interval performance analysis deviation exceeds or does not meet a test interval preset limit 50. The test interval performance alert 51 can be presented on the executive dashboard.

The test interval performance analysis can compare the assumed test interval 46 for a safety instrumented function to the actual test interval performance result 48. For example, for a particular SIF made up of transmitters, a logic solver, and a valve in a chemical plant, the assumed test interval can be once every 10 months, and the actual test interval can only occur every 14 months. As such, the test interval performance analysis in this example can cause the test interval performance alert 51 to appear on the executive dashboard to indicate that the actual test interval performance result 48 and the assumed test interval 46 do not match.

The health meter 10 can include computer instructions to compare estimated time in bypass used in the safety integrity level calculations to an actual time in bypass to generate a time in bypass analysis alert when the comparison indicates that the actual time in bypass deviates from a time in bypass preset limit 83. The health meter 10 can include the actual time in bypass 84, and the time in bypass analysis alert 85 can be provided on the executive dashboard.

The health meter 10 can include computer instructions to provide a percent completion analysis of safety integrity level calculations required by the risk assessment 82.

For example, the computer instructions to provide a percent completion analysis of safety integrity level calculations required by the risk assessment 82 can: identify safety instrumented functions needed for the safety integrity level calculations for the facility, compare safety instrumented functions needing safety integrity level calculations to safety instrumented functions for which safety integrity level calculations can be completed, generate a list of safety instrumented functions requiring safety integrity level calculations, and provide a safety integrity level calculation completion alert when the safety integrity level calculations identify a deviation that exceeds or does not meet a safety integrity level calculation completion preset limit. The safety integrity level calculation completion alert 71 can be presented on the executive dashboard.

The health meter 10 can include computer instructions to generate a percent completion alert when the percent complete deviates from a percent completion preset limit 65. The percent completion alert 66 can be presented on the executive dashboard.

The health meter 10 can include computer instructions to match each tag name to facility asset management tags names in a facility asset management system or a facility maintenance management system 59. The health meter 10 can include the tag names 60.

The health meter 10 can include computer instructions to provide a completion report on at least one analysis and a report of gap deficiencies 400.

The health meter 10 can include computer instructions for calculating a weighted score 80. For example, the computer instructions for calculating a weighted score 80 can apply: a weighted percentage for each analysis of initiating events, weighted percentage for the gap analysis, weighted percentage for the test interval performance analysis, weighted percentage for analysis of the failure rates, or combinations thereof. A sum of the calculated weighted score can be one hundred, and each weighed percentage can represent a deviation percentage provided by each analysis at a user defined selected time.

For example, an SIL calculation gap analysis can account for 50 percent of the weighted score, a test interval performance can account for 15 percent of the weighted score, an initiating event frequency can account for 15 percent of the weighted score, and a failure rate analysis can account for 20 percent of the weighted score.

The health meter 10 can include computer instructions to perform a safety instrumented systems lifecycle phases execution analysis 90.

For example, the computer instructions to perform a safety instrumented systems lifecycle phases execution analysis 90 can: compare safety instrumented systems lifecycle phases required by OSHA CFR 1910.119 and ANSI/ISA standard 84.001.001-2004 as produced by the International Society of Automation for assessing risk, and apply protection layers to actual safety instrumented systems lifecycle phases completed on at least one project.

The health meter 10 can have computer instructions to provide an additional report on at least one analysis 91.

In one or more embodiment, the information and alerts provided to the client devices by the health meter 10 can be addressed to different groups of people and can be prioritized depending upon the job descriptions and area of responsibilities of each person. For example, the heath meter 10 can include computer instructions to group individuals, prioritize groups of individuals, or combinations thereof 93.

The health meter 10 can have computer instructions to create a coding for individual equipment, facilities, and processes allowing for user designed priority groupings 92.

In one or more embodiments, the user designed priority groupings can include: a facility level grouping, geographical region grouping, ownership grouping of facilities, similar component grouping, or combinations thereof.

Figure 3:
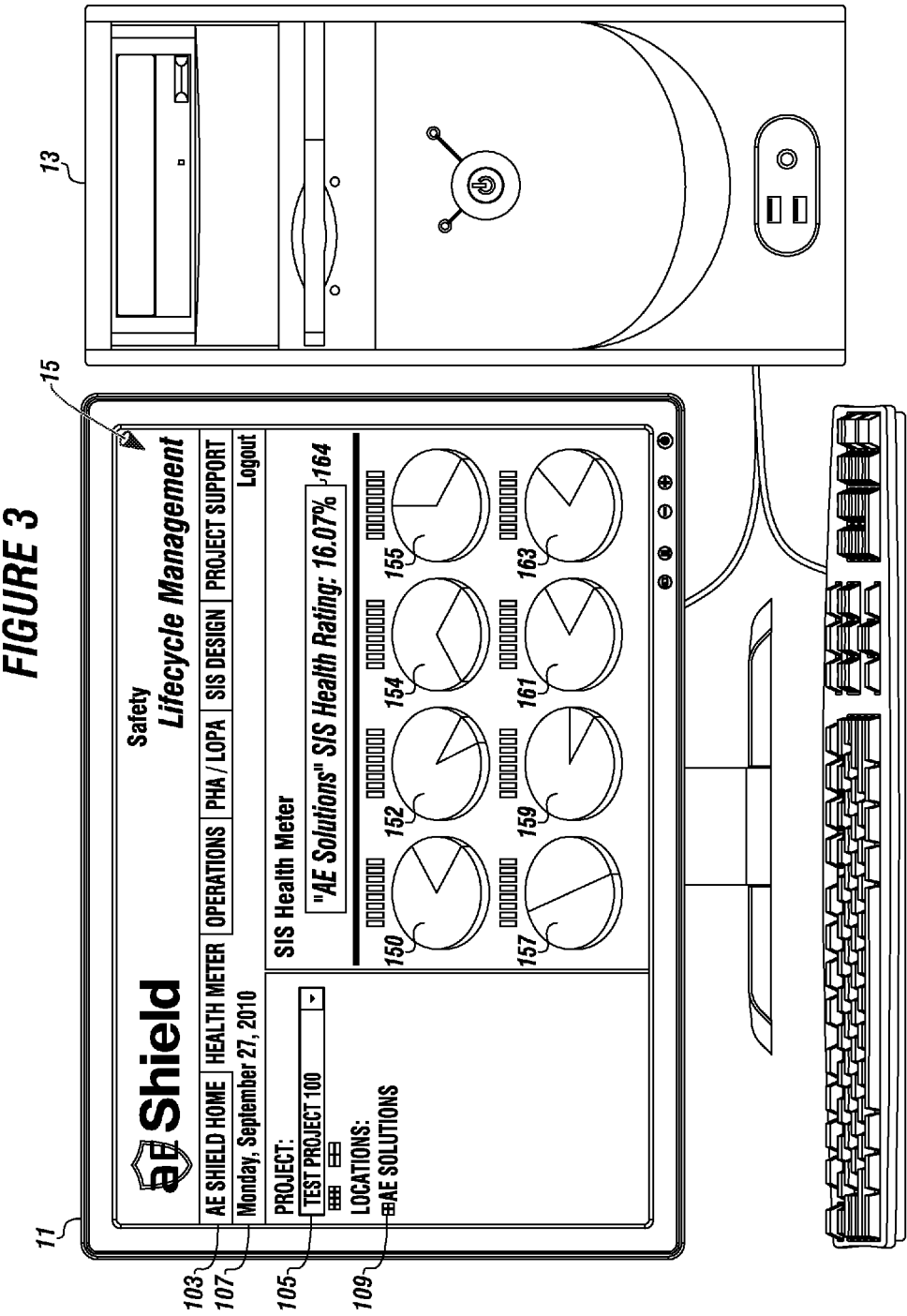
FIG. 3 depicts an embodiment of the executive dashboard.

FIG. 3 depicts an embodiment of a portion of the executive dashboard 15 presented on a display screen 11 of a client device 13. The executive dashboard 15 can be used for monitoring safety in multiple locations simultaneously.

The executive dashboard 15 can have various tabs 103 and a variety of drop down menus 105. The executive dashboard 15 can have at least one link to another server. The various tabs 103 can include tabs of safety instrumented systems (SIS) design, LOPA, and project support.

The executive dashboard 15 can present a date 107 date, including a day, as well as a location tree 109 showing a name and location of a project.

The executive dashboard 15 can present information in the form of a plurality of pie charts and a percent completion analysis of safety integrity level calculations required by the LOPA for the facility.

For example, a graph of the facility 150 can show a percent complete, here shown as 20 percent, and percent incomplete, here shown as 80 percent, for the facility.

The executive dashboard 15 can present results of a gap analysis 152, here showing that 9 passed the gap analysis without gaps, while 1 has gaps.

The executive dashboard 15 can present results of a test interval performance analysis 154 for the facility, here showing that 71 percent passed the test interval performance analysis and 29 percent are pending.

The executive dashboard 15 can present assumed failure rates compared to actual failure rates 155, here showing that 70 percent of the assumed failure rates matching the actual failure rates, while 30 percent of the assumed failure rates do not match the actual failure rates.

The executive dashboard 15 can present results from a time in bypass analysis 157, here shown having 50 percent availability with bypassing.

The executive dashboard 15 can also present a project completing percentage 159, assumed demand rates compared to actual demand rates 161, and assumed causes compared to actual causes 163.

The executive dashboard 15 can provide an SIS Health Rating 164, which can be presented in the form of a percentage based upon data from the various individual pie charts.

FIG. 4 depicts an SIL verification status report 399 showing a percent completion analysis of safety integrity level calculations required by the LOPA as provided by the health meter.

The SIL verification status report 399 can be depicted by the executive dashboard, and can include a report of gap deficiencies 401 as a pie chart showing the amount of completion that can have occurred based on the gap analysis. The depicted report of gap deficiencies 401 shows that 76 percent is incomplete and 24 percent is complete.

The SIL verification status report 399 can include an additional pie chart 402, which can show a breakdown of the completion analysis of safety integrity level calculations required by the LOPA. For example, the additional pie chart 402 can show the status of completion of asbuilt, here shown as 72 percent, edited, here shown as 24 percent, checked, here shown as 3 percent, and approved, here shown as 0 percent.

The SIL verification status report 399 can include two tables, including an incomplete instrumented protective functions table 404 and another complete instrumented protective functions table 406.

The incomplete instrumented protective functions table 404 can include a first column to identify the instrumented protective functions by name 408a, a second column to identify a status of the instrumented protective functions 410a, a third column to identify a driver 412a, a fourth column to identify a target IL 414a, a fifth column to identify a target RRF 416a, a sixth column to identify an achieved IL 418a, and a seventh column to identify an achieved RRF 420a.

The complete instrumented protective functions table 406 can include a first column to identify the instrumented protective functions by name 408b, a second column to identify a status of the instrumented protective functions 410b, a third column to identify a driver 412b, a fourth column to identify a target IL 414b, a fifth column to identify a target RRF 416b, a sixth column to identify an achieved IL 418b, and a seventh column to identify an achieved RRF 420b.

For example, the second columns to identify a status of the instrumented protective functions 410a-410b can state that the instrumented protective functions 426, 428, and 430 are "asbuilt", "edited", "checked", or another status indicator. The third columns to identify a driver 412a-412b can show the driver set as "S", "U", "S, C", or the like. The fourth columns to identify a target IL 414a-414b can show the target integrity level (IL) set as 0, 1, or 2. The fifth columns to identify a target RRF 416*a*-416*b* can show the target risk reduction factor (RRF) set as 0, 10, or 110. The sixth columns to identify an achieved integrity level (IL) 418*a*-418*b* can show the achieved IL set 1 or 2. The seventh columns to identify an achieved risk reduction factor (RRF) 420*a*-420*b* can show the achieved RRF as 0, 465, or 839.

The incomplete instrumented protective functions table 404 and complete instrumented protective functions table 406 can each include a column for the results 422*a*-422*b* for each instrumented protective function, showing that the instrumented protective function can have either failed or passed.

Each instrumented protective function can include a description. For example, the instrumented protective function 426, named AES-101-008, can have the description "Hot Oil Return From Fuel Gas Heater (HR-1322) High-High Pressure Closes Hot Oil ESD Valves" 424*a*.

The instrumented protective function 428, named AES-101-014, can have the description "MP Fuel Gas KO Drum (V-1231 Inlet High-High Pressure Closes Fuel Gas ESD Valve" 424*b*.

The instrumented protective function 430, named AES-106-003, can have the description "Hot Oil Heater (HR-1401) Inlet/Outlet Oil Low-Low Flow Shuts Down Heater" 424*c*.

FIG. 5 is an embodiment of a health meter report 501, which can be generated by the health meter and can include a gap analysis.

The health meter report 501 can include a process hazard analysis (PHA) report, or PHA Scenario summary table 500, an instrumented protective function summary table 502, and a tag number summary table 504.

The PHA Scenario summary table 500 can include a column for target IL 207, column for driver 208, and column for count 210. The counts can be totaled and shown in a row at an end of the PHA Scenario summary table 500. For example, the PHA Scenario summary table 500 can show a total count 223 and a breakdown of the total count 223, including a commercial count 224 and non-commercial count 226.

The instrumented protective function summary table 502 can include a column for target IL 212, column for driver 214, and column for count 216. The counts can be totaled and shown in a row at an end of the instrumented protective function summary table 502. For example, the instrumented protective function summary table 502 can show a total count 227 and a breakdown of the total count 227, including a commercial count 228 and non-commercial count 230.

The tag number summary table 504 can include a column for target IL 218, column for driver 220, and column for count 222. The counts can be totaled and shown in a row at an end of the tag number summary table 504. For example, the tag number summary table 504 can show a total count 231 and a breakdown of the total count 231, including a commercial count 232 and non-commercial count 233.

The health meter report 501 can include a table 506 showing commercial instrumented protective function gaps. The table 506 can list each instrumented protective function 244 and 259.

The table 506 can include an IPF name 235 column. For example, the instrumented protective function 244 can have the name AE2-114-027, and the instrumented protective function 259 can have the name AE2-114-028.

The table 506 can have a column for driver 237, column for target IL 239, column for target RRF 240, column for achieved IL 241, column for achieved RRF 242, and column for RRF gap 243.

For example, the instrumented protective function 259 can have the column for driver 237 set as 'C', target IL 239 set as '2', target RRF 240 set as '100', achieved RRF 242 set as '0', and RRF Gap 243 set as '100'.

Each instrumented protective function 244 and 259 can include a description. For example, the instrumented protective function 244 can be associated with the description "Refrigerant Compressor Train I (CMP-0206) Loss of Flame Shuts Down Compressor" 247, and the instrumented protective function 259 can be associated with the description "Refrigerant Compressor Train I (CMP-0206) High-High Temperature Shuts Down Compressor" 266.

Figure 6:
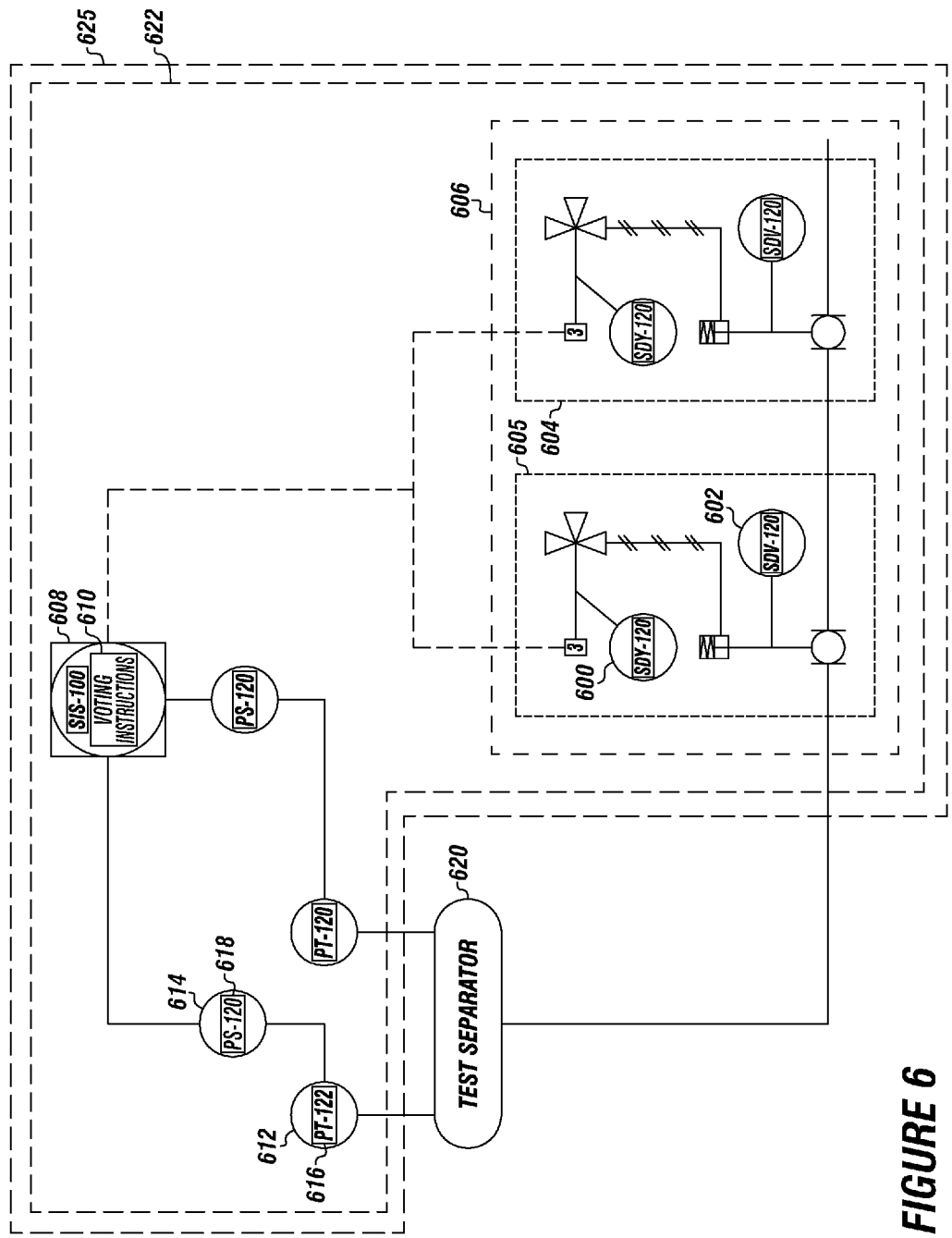
FIG. 6 depicts an example of a safety instrumented system having an instrumented protective function.

FIG. 6 depicts a graphical depiction showing tags and voting instructions for assembly groups and assemblies that can be presented on the health meter.

The instrumented protective function 622 of the safety instrumented system 625 is shown.

An assembly group 606 can include a first assembly 604 and second assembly 605.

The first assembly 604 and second assembly 605 can each include a first component, such as first component 'SDY-120' 600.

The first assembly 604 and second assembly 605 can each include a second component, such as second component 'SDV-120' 602.

The health meter can include a logic solver 'SIS-100' 608, which can have voting instructions 610. The voting instructions 610 can be the logic used to process signals and choose between alternatives.

The software model of the instrumented protective function 622 can include one or more software model first components 612 and software model second components 614.

Each software model component can be given a tag name. For example, the software model first components 612 can have a first tag name 616, such as 'PT-122', and the software model second component 614 can be given a second tag name 618, such as 'PT-120'.

The health meter can depict individual components, such as a test separator 620.

Computer instructions of the software model of the instrumented protective function 622 can create a tag based software model that represents functional specifications for each of the identified instrumented protective functions for the facility, identified piece of equipment, process, software, or combinations thereof in real-time.

Figure 7A:
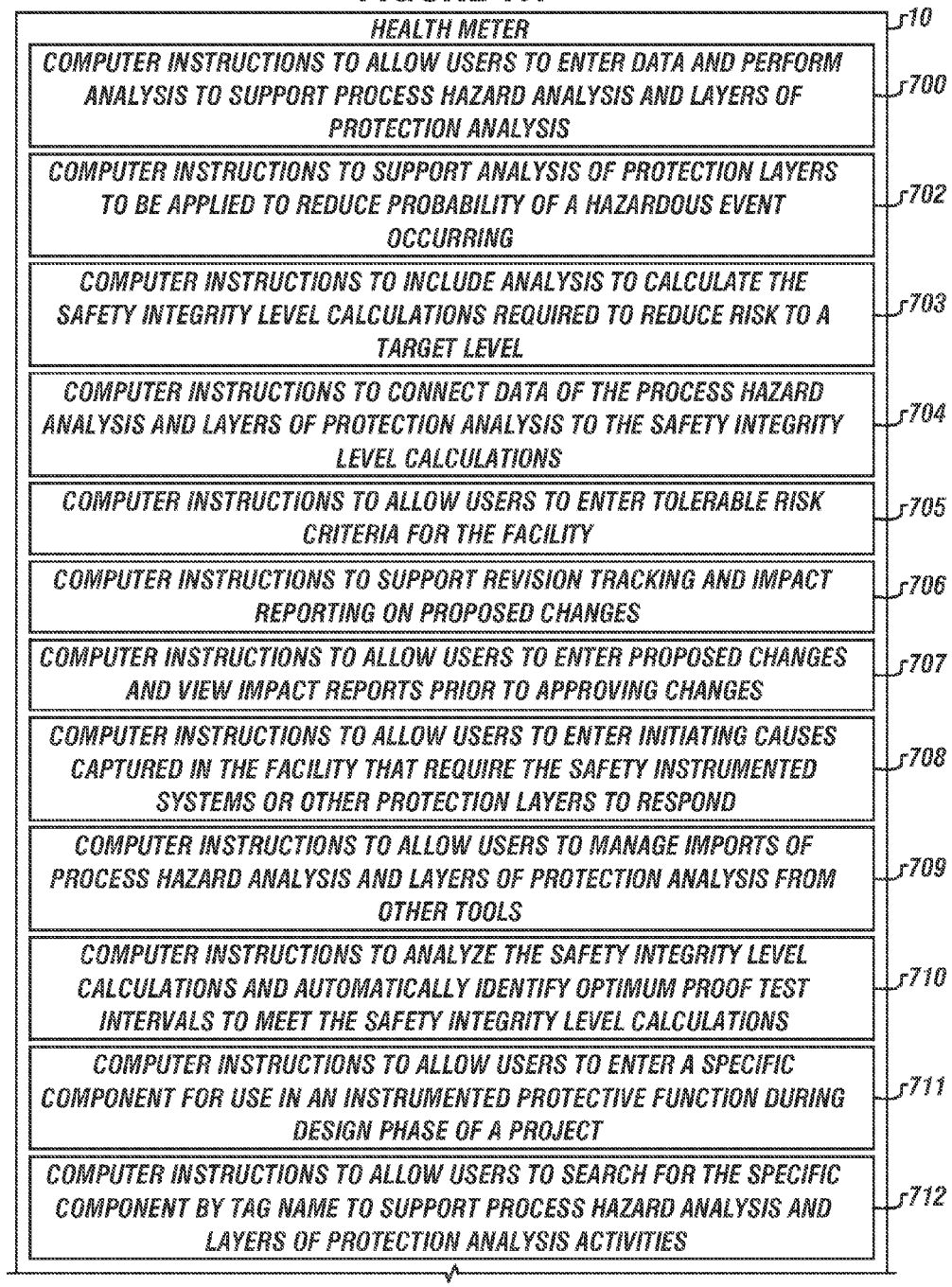

FIGS. 7A-7C depict an embodiment of the health meter 10, which can include various additional computer instructions usable with the executive dashboard.

The health meter 10 can include computer instructions to allow users to enter data and perform analysis to support process hazard analysis and layers of protection analysis 700.

The health meter 10 can include computer instructions to support analysis of protection layers to be applied to reduce probability of a hazardous event occurring 702.

The health meter 10 can include computer instructions to include analysis to calculate the safety integrity level calculations required to reduce risk to a target level 703.

The health meter 10 can include computer instructions to connect data of the process hazard analysis and layers of protection analysis to the safety integrity level calculations 704.

The health meter 10 can include computer instructions to allow users to enter tolerable risk criteria for the facility 705.

The health meter 10 can include computer instructions to support revision tracking and impact reporting on proposed changes 706.

The health meter 10 can include computer instructions to allow users to enter proposed changes and view impact reports prior to approving changes 707.

The health meter 10 can include computer instructions to allow users to enter initiating causes captured in the facility that require the safety instrumented systems or other protection layers to respond 708.

The health meter 10 can include computer instructions to allow users to manage imports of process hazard analysis and layers of protection analysis from other tools 709.

The health meter 10 can include computer instructions to analyze the safety integrity level calculations and automatically identify optimum proof test intervals to meet the safety integrity level calculations 710.

The health meter 10 can include computer instructions to allow users to enter a specific component for use in an instrumented protective function during design phase of a project 711.

The health meter 10 can include computer instructions to allow users to search for the specific component by tag name to support process hazard analysis and layers of protection analysis activities 712.

FIG. 7B is a continuation of FIG. 7A. The health meter 10 can include computer instructions to create a report showing specific component information for like components used for risk reduction in the process hazard analysis and layers of protection analysis for the facility 713.

The health meter 10 can include computer instructions to create a recommendations log from the process hazard analysis and layers of protection analysis studies 714.

The health meter 10 can include computer instructions to allow users to search the recommendations log based on: tag name, facility, module, area, safety instrumented functions name, or process hazard analysis node number 715.

The health meter 10 can include computer instructions to allow calculations that allow users to compare at least two possible architectures for a safety instrumented function 716.

The health meter 10 can include computer instructions that allow users to create copies of a first possible architecture and make modifications of the first possible architecture 717.

The health meter 10 can include computer instructions that allow users to change which of the possible architectures is currently marked for use 718.

The health meter 10 can include computer instructions to allow users to import data for an existing facility asset management system to populate a component library in the data storage 719.

The health meter 10 can include the component library 720.

The health meter 10 can include computer instructions to create a report identifying deviations between the facility asset management system of the facility and the imported data in the data storage 721.

The health meter 10 can include computer instructions to allow users to edit cause and effect documents, and allow the users to add cause and effect documents not used in the safety integrity level calculations 722.

The health meter 10 can include computer instructions to allow users to create protections layers not used in layers of protection analysis or the safety integrity level calculations 723.

The health meter 10 can include computer instructions to enter effects as additional actions 724.

The health meter 10 can include computer instructions to allow users to view reports of project status 725.

FIG. 7C is a continuation of FIG. 7B. The health meter 10 can include computer instructions to generate facility acceptance tests using a software model of physical and functional specifications 726.

The health meter 10 can include a software model of physical and functional specifications 727.

The health meter 10 can include computer instructions to generate site acceptance tests using the software model of physical and functional specifications 728.

The health meter 10 can include computer instructions to generate functional test plans for each safety instrumented function of the instrumented protective function 729.

The health meter 10 can include computer instructions to generate a critical alarm list including risk ranking of hazards to which alarms applies 730.

The health meter 10 can include computer instructions to generate a report of test performance for critical alarms 731.

The health meter 10 can include computer instructions to generate a report showing impact of bypassing on a risk gap being opened by placing equipment in bypass 732.

In one or more embodiments, the health meter 10 can include computer instructions to categorize failures form failure rate analysis and provide statistically analyzed failure rates to be used in safety integrity level calculations 733.

The health meter 10 can include computer instructions to allow users to select which set of reliability data they want to use 734. For example, the users can select from data stored in a reliability library 735, data collected from the facility and analyzed by failure rate analysis, or user entered data.

The health meter 10 can include computer instructions and system architecture to support management of change (MOC) of data records 736.

For example, the health meter 10 can support "asbuilt" or "master records" remaining untouched while "project" copies of records are edited and manipulated by users. Each edited record can be checked, approved, and then moved to "asbuilt" by qualified users. Qualified users can include users with sufficient permissions and roles tied to their respective login indicating that they are able to perform the check and approve activities. Previous "asbuilt" versions of records can be archived to maintain a revision history.

The health meter 10 can include computer instructions that permit a user to change any one component, one assembly, one assembly group, or combinations thereof or the voting instructions of a tag based software model 738.

The health meter 10 can include computer instructions that provide a connection to tag based assets of the facility that can allow transfer of data from tag based assets to the data storage associated with the processor 740.

The health meter 10 can include computer instructions to use relationship tables and libraries to form a cause and effect report 742.

While these embodiments have been described with emphasis on the embodiments, it should be understood that within the scope of the appended claims, the embodiments might be practiced other than as specifically described herein.

What is claimed is:

1. A non-transitory computer readable medium providing a health meter for evaluating a status of process safety at a facility as an executive dashboard, wherein the executive dashboard is viewable by a plurality of users simultaneously via client devices with display screens through a network, wherein the executive dashboard is resident in a data storage connected to a processor, and wherein the health meter comprises:
   a. computer instructions for performing safety integrity level calculations and a gap analysis comprising:
      (i) using target risk reduction requirements for each instrumented protective function in a safety instrumented system for the facility;

(ii) comparing the target risk reduction requirement to an achieved risk reduction; and
(iii) providing a report of gap deficiencies;
b. computer instructions to provide a gap analysis alert when a gap analysis deviation exceeds or does not meet a gap analysis preset limit;
c. computer instructions for forming a pie chart based on a comparison of an assumed frequency of initiating events in a risk assessment to an actual frequency of initiating events leading to a hazard;
d. computer instructions for generating an event frequency alert when a comparison of the actual frequency of initiating events indicates that the actual frequency of initiating events exceeds or does not meet a frequency preset limit, wherein the gap analysis provides a comparison between safety values, the target risk reduction requirements from the Layer of Protection Analysis (LOPA) and the achieved Risk Reduction from the Safety Integrity Level (SIL) calculations;
e. computer instructions for forming a pie chart based on a comparison of assumed initiating event sources in the risk assessment to actual initiating event sources leading to the hazard;
f. computer instructions for generating an initiating event source alert when the actual initiating event sources deviate from as assumed initiating event sources;
g. computer instructions for forming a pie chart based on a comparison of actual failure rates to assumed failure rates in the safety integrity level calculations;
h. computer instructions to generate an actual failure rate analysis alert when a comparison of the actual failure rates to assumed failure rates indicates the actual failure rates deviate from a failure rate preset limit;
i. computer instructions to form a pie chart based on a comparison of an assumed test interval in the safety integrity level calculations to an actual test interval performance results;
j. computer instructions to provide a test interval performance alert when a test interval performance analysis deviation exceeds or does not meet a test interval preset limit;
k. computer instructions to form a pie chart based on a comparison of estimated time in bypass used in the safety integrity level calculations to an actual time in bypass to generate a time in bypass analysis alert when the comparison indicates that the actual time in bypass deviates from a time in bypass preset limit;
l. computer instructions to provide a percent completion analysis of safety integrity level calculations required by the risk assessment; and
m. computer instructions to generate a percent completion alert when the percent complete deviates from a percent completion preset limit;
n. computer instructions for calculating a weighted score by converting each said comparison to a weighted percentage and adding the weighted percentages to form an safety instrumented systems health rating score, wherein each weighted percentage represents a deviation percentage provided by each comparison; and
o. computer instructions to form an executive dashboard concurrently displaying the pie charts, the safety instrumented systems health rating score, and the alerts, to view process safety at the facility.

2. The non-transitory computer readable medium providing the health meter of claim 1, wherein the computer instructions to provide a percent completion analysis of safety integrity level calculations required by the layer of protection analysis by:
a. identifying safety instrumented functions needed for the safety integrity level calculations for the facility;
b. comparing safety instrumented functions needing safety integrity level calculations to safety instrumented functions for which safety integrity level calculations are completed;
c. generating a list of safety instrumented functions requiring safety integrity level calculations; and
d. providing a safety integrity level calculation completion alert when the safety integrity level calculations identify a deviation that exceeds or does not meet a safety integrity level calculation completion preset limit.

3. The non-transitory computer readable medium providing the health meter of claim 1, further comprising computer instructions to perform a safety instrumented systems lifecycle phases execution analysis by:
a. comparing safety instrumented systems lifecycle phases required by OS OSHA CFR 1910.119 and ANSI/ISA standard 84.001.001-2004 as produced by the International Society of Automation for assessing risk; and
b. applying protection layers to actual safety instrumented systems lifecycle phases completed on at least one project.

4. The non-transitory computer readable medium providing the health meter of claim 1, further comprising computer instructions to provide a completion report on at least one analysis and a report of gap deficiencies.

5. The non-transitory computer readable medium providing the health meter of claim 1, further comprising a safety instrumented systems lifecycle phases execution analysis.

6. The non-transitory computer readable medium providing the health meter of claim 1, further comprising computer instructions to provide an additional report on at least one analysis.

7. The non-transitory computer readable medium providing the health meter of claim 1, wherein the health meter provides a tag name for each of the instrumented protective functions, and wherein the health meter further comprises computer instructions to match each tag name to facility asset management tags names in a facility asset management system or a facility maintenance management system.

8. The non-transitory computer readable medium providing the health meter of claim 1, further comprising computer instructions to create a coding for individual equipment, facilities, and processes allowing for user designed priority groupings.

9. The non-transitory computer readable medium providing the health meter of claim 1, wherein the health meter is configured to be simultaneously transmitted to the client devices through a plurality of different gateway protocols through the network.

10. The non-transitory computer readable medium providing the health meter of claim 1, further comprises computer instructions to allow users to enter data and perform analysis to support process hazard analysis and layers of protection analysis.

11. The non-transitory computer readable medium providing the health meter of claim 10, further comprising computer instructions to connect data of the process hazard analysis and layers of protection analysis to the safety integrity level calculations.

12. The non-transitory computer readable medium providing the health meter of claim 1, further comprising computer instructions to support analysis of protection layers to be applied to reduce probability of a hazardous event occurring.

13. The non-transitory computer readable medium providing the health meter of claim 1, further comprising computer instructions to include analysis to calculate the safety integrity level calculations required to reduce risk to a target level.

14. The non-transitory computer readable medium providing the health meter of claim 1, further comprises computer instructions to allow users to enter tolerable risk criteria for the facility.

15. The non-transitory computer readable medium providing the health meter of claim 1, further comprising computer instructions to support revision tracking and impact reporting on proposed changes.

16. The non-transitory computer readable medium providing the health meter of claim 1, further includes computer instructions to allow users to enter proposed changes and view impact reports prior to approving changes.

17. The non-transitory computer readable medium providing the health meter of claim 1, further comprising computer instructions to allow users to enter initiating causes captured in the facility that require the safety instrumented systems or other protection layers to respond.

18. The non-transitory computer readable medium providing the health meter of claim 1, further comprising computer instructions to allow users to manage imports of process hazard analysis and layers of protection analysis from other tools.

19. The non-transitory computer readable medium providing the health meter of claim 1, further comprising computer instructions to analyze the safety integrity level calculations and automatically identify optimum proof test intervals to meet the safety integrity level calculations.

20. The non-transitory computer readable medium providing the health meter of claim 1, further comprising computer instructions to allow users to enter a specific component for use in an instrumented protective function during design phase of a project.

21. The non-transitory computer readable medium providing the health meter of claim 20, further comprising computer instructions to allow users to search for the specific component by tag name to support process hazard analysis and layers of protection analysis activities.

22. The non-transitory computer readable medium providing the health meter of claim 21, further comprising computer instructions to create a report showing specific component information for like components used for risk reduction in the process hazard analysis and layers of protection analysis for the facility.

23. The non-transitory computer readable medium providing the health meter of claim 1, further comprising computer instructions to create a recommendations log from the process hazard analysis and layers of protection analysis studies.

24. The non-transitory computer readable medium providing the health meter of claim 23, further comprising computer instructions to allow users to search the recommendations log based on: tag name, facility, module, area, safety instrumented functions name, or process hazard analysis node number.

25. The non-transitory computer readable medium providing the health meter of claim 1, further comprising computer instructions to allow calculations that allow users to compare at least two possible architectures for a safety instrumented function.

26. The non-transitory computer readable medium providing the health meter of claim 25, further comprising computer instructions that allow users to create copies of a first possible architecture and make modifications of the first possible architecture.

27. The non-transitory computer readable medium providing the health meter of claim 26, further comprising computer instructions that allow users to change which of the possible architectures is currently marked for use.

28. The non-transitory computer readable medium providing the health meter of claim 1, further comprising computer instructions to allow users to import data for an existing facility asset management system to populate a component library in the data storage.

29. The non-transitory computer readable medium providing the health meter of claim 28, further comprising computer instructions to create a report identifying deviations between the facility asset management system of the facility and the imported data in the data storage.

30. The non-transitory computer readable medium providing the health meter of claim 1, further comprising computer instructions to allow users to edit cause and effect documents, and allow the users to add cause and effect documents not used in the safety integrity level calculations.

31. The non-transitory computer readable medium providing the health meter of claim 1, further comprising computer instructions to allow users to create protections layers not used in layers of protection analysis or the safety integrity level calculations.

32. The non-transitory computer readable medium providing the health meter of claim 1, further comprising computer instructions to enter effects as additional actions.

33. The non-transitory computer readable medium providing the health meter of claim 1, further comprising computer instructions to allow users to view reports of project status.

34. The non-transitory computer readable medium providing the health meter of claim 1, further comprising computer instructions to generate facility acceptance tests using a software model of physical and functional specifications.

35. The non-transitory computer readable medium providing the health meter of claim 34, further comprising computer instructions to generate site acceptance tests using the software model of physical and functional specifications.

36. The non-transitory computer readable medium providing the health meter of claim 1, further comprising computer instructions to generate functional test plans for each safety instrumented function of the instrumented protective function.

37. The non-transitory computer readable medium providing the health meter of claim 1, further comprising computer instructions to generate a critical alarm list including risk ranking of hazards to which alarms applies.

38. The non-transitory computer readable medium providing the health meter of claim 37, further comprising computer instructions to generate a report of test performance for critical alarms.

39. The non-transitory computer readable medium providing the health meter of claim 1, further comprising computer instructions to generate a report showing impact of bypassing on a risk gap being opened by placing equipment in bypass.

* * * * *